United States Patent
Kamo et al.

(10) Patent No.: US 10,396,353 B2
(45) Date of Patent: Aug. 27, 2019

(54) NEGATIVE ELECTRODE ACTIVE MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE MATERIAL FOR NON-AQUEOUS ELECTROLYTE SECONDARY BATTERY

(71) Applicant: SHIN-ETSU CHEMICAL CO., LTD., Tokyo (JP)

(72) Inventors: Hiromichi Kamo, Takasaki (JP); Kohta Takahashi, Takasaki (JP); Takakazu Hirose, Annaka (JP); Koichiro Watanabe, Annaka (JP); Masahiro Furuya, Takasaki (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 59 days.

(21) Appl. No.: 15/511,075

(22) PCT Filed: Jul. 30, 2015

(86) PCT No.: PCT/JP2015/003831
§ 371 (c)(1),
(2) Date: Mar. 14, 2017

(87) PCT Pub. No.: WO2016/056155
PCT Pub. Date: Apr. 14, 2016

(65) Prior Publication Data
US 2017/0288216 A1    Oct. 5, 2017

(30) Foreign Application Priority Data

Oct. 8, 2014    (JP) .............................. 2014-207514

(51) Int. Cl.
*H01M 4/36*    (2006.01)
*H01M 4/48*    (2010.01)
(Continued)

(52) U.S. Cl.
CPC ......... *H01M 4/366* (2013.01); *H01M 4/0416* (2013.01); *H01M 4/0428* (2013.01);
(Continued)

(58) Field of Classification Search
None
See application file for complete search history.

(56) References Cited

U.S. PATENT DOCUMENTS 5,395,711 A    3/1995    Tahara et al.
7,459,236 B2   12/2008   Konishiike et al.
(Continued)

FOREIGN PATENT DOCUMENTS

CN    1513922 A    7/2004
EP    3062371 A1   8/2016
(Continued)

OTHER PUBLICATIONS

Apr. 5, 2018 Extended European Search Report issued in European Patent Application No. 15849280.1.
(Continued)

*Primary Examiner* — Basia A Ridley
*Assistant Examiner* — Heng M. Chan
(74) *Attorney, Agent, or Firm* — Oliff PLC

(57) ABSTRACT

A negative electrode active material for a non-aqueous electrolyte secondary battery, including negative electrode active material particles containing a silicon compound
(Continued)

($SiO_x$ where $0.5 \leq x \leq 1.6$), the negative electrode active material particles being coated with a carbon coating composed of a substance at least partially containing carbon, the carbon coating having a density ranging from 1.2 g/cm$^3$ to 1.9 g/cm$^3$, the negative electrode active material particles having a characteristic of type II or type III adsorption-desorption isotherm in the IUPAC classification, as obtained by adsorption-desorption isotherm measurement with nitrogen gas. This negative electrode active material can increase the battery capacity and improve the cycle performance and battery initial efficiency.

1 Claim, 1 Drawing Sheet

(51) Int. Cl.
    H01M 4/04     (2006.01)
    H01M 4/38     (2006.01)
    H01M 4/02     (2006.01)
    H01M 4/133    (2010.01)
    H01M 4/587    (2010.01)
    H01M 10/0525  (2010.01)

(52) U.S. Cl.
    CPC ......... H01M 4/0471 (2013.01); H01M 4/133 (2013.01); H01M 4/362 (2013.01); H01M 4/386 (2013.01); H01M 4/483 (2013.01); H01M 4/587 (2013.01); H01M 10/0525 (2013.01); H01M 2004/027 (2013.01); H01M 2220/30 (2013.01); Y02T 10/7011 (2013.01)

(56) References Cited

U.S. PATENT DOCUMENTS

| | | | |
|---|---|---|---|
| 8,377,592 B2 | 2/2013 | Jeong et al. | |
| 2003/0215711 A1* | 11/2003 | Aramata | B82Y 30/00 429/218.1 |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2010/0243951 A1 | 9/2010 | Watanabe et al. | |
| 2012/0077087 A1 | 3/2012 | Cho et al. | |

FOREIGN PATENT DOCUMENTS

| | | | |
|---|---|---|---|
| JP | 2997741 B2 | 1/2000 | |
| JP | 2001-185127 A | 7/2001 | |
| JP | 2002-042806 A | 2/2002 | |
| JP | 2004-047404 A | 2/2004 | |
| JP | 2005-025991 A | 1/2005 | |
| JP | 2006-114454 A | 4/2006 | |
| JP | 2006-164954 A | 6/2006 | |
| JP | 2007-234255 A | 9/2007 | |
| JP | 2008-177346 A | 7/2008 | |
| JP | 2008-251369 A | 10/2008 | |
| JP | 2008-282819 A | 11/2008 | |
| JP | 2009-070825 A | 4/2009 | |
| JP | 2009-205950 A | 9/2009 | |
| JP | 2009-212074 A | 9/2009 | |
| JP | 2012-523674 A | 10/2012 | |
| JP | 2013-513206 A | 4/2013 | |
| JP | 2014-175071 A | 9/2014 | |
| WO | 2011/068767 A1 | 6/2011 | |
| WO | WO-2013054481 A1 * | 4/2013 | .............. H01M 4/13 |
| WO | 2014/065418 A1 | 5/2014 | |

OTHER PUBLICATIONS

Oct. 27, 2015 International Search Report issued in International Patent Application No. PCT/JP2015/003831.

Dec. 28, 2018 Office Action issued in Chinese Application No. 201580053966.4.

* cited by examiner

NEGATIVE ELECTRODE ACTIVE MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE MATERIAL FOR NON-AQUEOUS ELECTROLYTE SECONDARY BATTERY

TECHNICAL FIELD

The present invention relates to a negative electrode active material for a non-aqueous electrolyte secondary battery, a negative electrode for a non-aqueous electrolyte secondary battery, a non-aqueous electrolyte secondary battery, and a method of producing a negative electrode material for a non-aqueous electrolyte secondary battery.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

The negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials, to an integrated type in which the materials are directly accumulated on a current collector.

Use of silicon as a main material of a negative electrode active material, however, expands or shrinks a negative electrode active material particle when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material, an electronic conduction material, is disposed on the surface of silicon oxide particles so that higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a lithium containing material is added to a negative electrode, and pre-doping that decompose lithium and moves the lithium to a positive electrode at a higher negative-electrode potential so that the first charge and discharge efficiency is improved (See Patent Document 6, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give conductivity so that improved cycle performance is achieved (See Patent Document 11, for example). Patent Document 11 describes that a shift value of the graphite coating, which is obtained from a Raman spectrum, has broad peaks at 1330 $cm^{-1}$ and 1580 $cm^1$ and a ratio $I_{1330}/I_{1580}$ of their intensity shows $1.5 < I_{1330}/I_{1580} < 3$.

Moreover, a particle having an Si-microcrystal phase dispersing in a silicon dioxide is used to achieve higher battery capacity and improved cycle performance (See Patent Document 12, for example). Finally, a silicon oxide having a silicon-to-oxygen atomicity ratio of 1:y ($0 < y < 2$) is used to improve overcharge and overdischarge performance (See Patent Document 13, for example).

CITATION LIST

Patent Literature

Patent Document 1: Japanese Unexamined Patent publication (Kokai) No. 2001-185127

Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2013-513206
Patent Document 7: Japanese Unexamined Patent publication (Kokai) No. 2008-282819
Patent Document 8: Japanese Unexamined Patent publication (Kokai) No. 2008-251369
Patent Document 9: Japanese Unexamined Patent publication (Kokai) No. 2008-177346
Patent Document 10: Japanese Unexamined Patent publication (Kokai) No. 2007-234255
Patent Document 11: Japanese Unexamined Patent publication (Kokai) No. 2009-212074
Patent Document 12: Japanese Unexamined Patent publication (Kokai) No. 2009-205950
Patent Document 13: Japanese Patent No. 2997741

SUMMARY OF INVENTION

Technical Problem

As described previously, small mobile devices, represented by electronic devices, have been developed to improve their performance and increase their functions. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need the same cycle performance as non-aqueous electrolyte secondary batteries using carbon materials.

The present invention was accomplished in view of the above problems, and an object thereof is to provide a negative electrode active material for a non-aqueous electrolyte secondary battery that can increase the battery capacity and improve the cycle performance and the battery initial efficiency. Another object of the present invention is to provide a negative electrode for a non-aqueous electrolyte secondary battery using the negative electrode active material and a non-aqueous electrolyte secondary battery using the negative electrode. Further object of the present invention is to provide a method of producing negative electrode material for a non-aqueous electrolyte secondary battery that can increase the battery capacity and is excellent in cycle performance and battery initial efficiency.

Solution to Problem

To achieve the objects, the present invention provides a negative electrode active material for a non-aqueous electrolyte secondary battery, comprising negative electrode active material particles containing a silicon compound expressed by $SiO_x$ where $0.5 \leq x \leq 1.6$, the negative electrode active material particles being coated with a carbon coating composed of a substance at least partially containing carbon, the carbon coating having a density ranging from 1.2 g/cm$^3$ to 1.9 g/cm$^3$, the negative electrode active material particles having a characteristic of type II or type III adsorption-desorption isotherm in the IUPAC classification, as obtained by adsorption-desorption isotherm measurement with nitrogen gas.

The inventive negative electrode active material containing the above negative electrode active material particles has adequate conductivity, as well as appropriately adjusted conductivity on the particle surface and compatibility with a binder. A negative electrode using this material can exhibit excellent capacity retention rate and initial efficiency. In addition, this negative electrode active material, which is mainly made of a silicon compound, can achieve significantly larger battery capacity than a material mainly made of a carbon-based active material.

An amount of the carbon coating preferably ranges from 0.1 mass % to 25 mass % with respect to a total amount of the silicon compound and the carbon coating.

When the carbon coating is contained within the above range, the silicon compound, which has high capacity, is contained at an adequate amount so that a sufficient battery capacity can be achieved.

Preferably, the carbon coating exhibits fragments of $C_yH_z$ compound when subjected to TOF-SIMS, and a part of the fragments of $C_yH_z$ compound satisfies $6 \geq y \geq 2$ and $2y+2 \geq z \geq 2y-2$.

The surface on which fragments of compound such as $C_yH_z$ compound are detected through Time-of-Flight Secondary Ion Mass Spectrometry (TOF-SIMS) is compatible with a negative electrode binder such as carboxymethyl cellulose (CMC) or polyimide, resulting in better battery performances.

A ratio of a $C_4H_9$ detected intensity D to a $C_3H_5$ detected intensity E of the fragments of $C_yH_z$ compound exhibited by the carbon coating during the TOF-SIMS preferably satisfies $2.5 \geq D/E \geq 0.3$.

When the detected intensity ratio of $C_4H_9$ to $C_3H_5$ is within the above range, the conductivity improvement effect of the carbon coating can be more effectively obtained.

The negative electrode active material particles preferably exhibit a resistivity ranging from $1.0 \times 10^{-2}$ Ω·cm to $1.0 \times 10^1$ Ω·cm when compressed to 1.5 g/cm$^3$.

The negative electrode active material particles exhibiting the above range of resistivity when compressed to 1.5 g/cm$^3$ can achieve sufficient and adequate conductivity.

The negative electrode active material particles preferably have a specific surface area ranging from 1.0 m$^2$/g to 15 m$^2$/g.

The negative electrode active material particles having the above range of specific surface area enables a battery containing the particles to have excellent electrolyte impregnation property and excellent binding property.

The negative electrode active material particles preferably have a negative zeta potential in a 0.1% carboxymethyl cellulose aqueous solution.

When the negative electrode active material particles dispersed in the above aqueous solution have such a zeta potential, slurry for producing a negative electrode material can be stabilized.

Preferably, the carbon coating exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of an intensity of the scattering peak at 1330 cm$^{-1}$ to that at 1580 cm$^{-1}$.

When the carbon coating of the negative electrode active material particles contained in the inventive negative electrode active material satisfies the above intensity ratio, the carbon coating can have an optimum ratio between a carbon material with diamond structure and a carbon material with graphite structure.

An average thickness of the carbon coating on the silicon compound preferably ranges from 5 nm to 500 nm.

When the average thickness of the carbon coating satisfies the above range, sufficient conductivity can be provided as well as the proportion of the silicon compound can be increased.

An average coverage of the carbon coating on the silicon compound is preferably 30% or more.

This average coverage enables the carbon components to effectively improve the conductivity of a lithium-ion secondary battery using the negative electrode active material containing such negative electrode active material particles.

The carbon coating is preferably formed by pyrolizing a compound containing carbon.

The carbon coating formed in this manner has high average coverage on the surface of the silicon compound.

The silicon compound preferably satisfies formula (1) of $5.0 \geq A/B \geq 0.01$ and $6.0 \geq (A+B)/C \geq 0.02$ where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}$Si-MAS-NMR spectrum.

When the silicon compound contained in the negative electrode active material particles has a peak area satisfying formula (1) in $^{29}$Si-MAS-NMR spectrum, the proportion of amorphous silicon, which can inhibit the expansion of a negative electrode due to the insertion of lithium, is high, and thus better cycle performance can be obtained. In addition, this can prevent the reduction in electronic conductivity in the silicon compound since the proportion of the silica components is smaller than that of the silicon components.

Preferably, the silicon compound exhibits a diffraction peak having a half width (2θ) of 1.2° or more, the diffraction peak being attributable to a (111) crystal plane and obtained by X-ray diffraction, and a crystallite size attributable to the crystal plane is 7.5 nm or less.

This silicon compound, which exhibits the above half width and crystallite size, has low crystallinity and contains few Si crystal, improving the battery performances. In addition, the presence of the silicon compound having low crystallinity enables stable generation of a lithium compound.

The silicon compound preferably has a median size ranging from 0.5 μm to 20 μm.

The negative electrode active material containing the silicon compound with the above median size facilitates occlusion and emission of lithium ions and inhibits breakage of the particles at charging and discharging. As a result, the capacity retention rate can be improved.

The negative electrode active material particles preferably at least partially contain fibrous carbon components.

When the negative electrode active material particles contain fibrous carbon components, the fibrous carbon components improve conductivity between the active materials, thereby improving the battery performances.

The negative electrode active material particles preferably at least partially contain agglomerated carbon components.

When the negative electrode active material particles contain agglomerated carbon components, the agglomerated carbon components improve conductivity around the active material, thereby improving the battery performances.

Furthermore, the present invention provides a negative electrode for a non-aqueous electrolyte secondary battery, comprising any one of the above negative electrode active material as a negative electrode active material, wherein the negative electrode has a charge and discharge capacity attributable to the carbon coating.

The negative electrode using the inventive negative electrode active material enables a non-aqueous electrolyte secondary battery using this negative electrode to have higher battery capacity and improved cycle performance and initial charge and discharge performance.

The negative electrode active material preferably at least partially containing lithium.

When the negative electrode active material in the negative electrode contains lithium, the initial efficiency is improved. This causes the reduction in discharging cutoff voltage of the negative electrode used in a non-aqueous electrolyte secondary battery, thus improving the retention rate.

The negative electrode according to the present invention preferably further comprises a carbon-based active material as the negative electrode active material.

The negative electrode that contains a carbon-based active material besides the inventive negative electrode active material can increase the capacity of the negative electrode and achieve better cycle performance and initial charge and discharge performance.

A proportion of the silicon compound is preferably 5 mass % or more with respect to a total amount of the carbon-based active material and the silicon compound.

When the silicon compound is contained at the above proportion, the battery capacity can be further increased.

A median size F of the carbon-based active material and a median size G of the silicon-based active material preferably satisfy $25 \geq F/G \geq 0.5$.

When the above relationship exists between the median size F of the carbon-based active material and the median size G of the silicon-based active material, breakage of the mixture layer can be prevented. Moreover, as the carbon-based active material becomes large relative to the silicon compound, the volume density of the negative electrode at charging, the initial efficiency, and thus the battery energy density are improved.

The carbon-based active material is preferably a graphite material.

The graphite material can exhibit better initial efficiency and capacity retention rate than other carbon-based active materials, and thus is preferable.

Furthermore, the present invention provides a non-aqueous electrolyte secondary battery comprising any one of the above negative electrode.

The non-aqueous electrolyte secondary battery using the inventive negative electrode has high capacity and good cycle performance and initial charge and discharge performance.

Furthermore, the present invention provides a method of producing a negative electrode material for a non-aqueous electrolyte secondary battery containing negative electrode active material particles, the method comprising: producing a silicon compound expressed by $SiO_x$ where $0.5 \leq x \leq 1.6$; coating a surface of the silicon compound with a carbon coating composed of a substance at least partially containing carbon; selecting, from the silicon compound with the carbon coating, a silicon compound having the carbon coating with a density ranging from 1.2 g/cm$^3$ to 1.9 g/cm$^3$ and having a characteristic of type II or type III adsorption-desorption isotherm in the IUPAC classification as obtained by adsorption-desorption isotherm measurement with nitrogen gas; and using the selected silicon compound coated with the carbon coating as the negative electrode active material particles to produce the negative electrode material.

Such a method can produce a negative electrode material, for use in a non-aqueous electrolyte secondary battery, which exhibits excellent capacity retention rate and initial efficiency with high capacity, by using the selected silicon compound as the negative electrode active material particles.

Advantageous Effects of Invention

The inventive negative electrode active material allows a lithium-ion secondary battery using this material to have higher capacity, better cycle performance, and better initial charge and discharge performance. Moreover, the negative electrode using the inventive negative electrode active material for a non-aqueous electrolyte secondary battery and the secondary battery using the negative electrode can achieve the same performances. In addition, electronic devices, machine tools, electric vehicles, and power storage systems, etc., using the inventive secondary battery also can achieve the same effect.

Furthermore, the inventive method of producing a negative electrode material can produce a negative electrode material, for use in a non-aqueous electrolyte secondary battery, having good cycle performance and initial charge and discharge performance.

DESCRIPTION OF EMBODIMENTS

Figure 1:
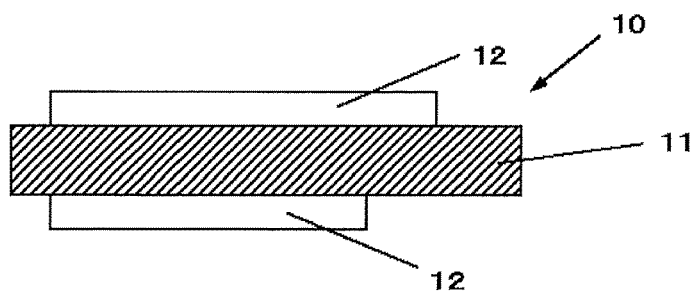
FIG. 1 is a schematic cross-sectional view of a configuration of a negative electrode for a non-aqueous electrolyte secondary battery according to an embodiment of the invention.

As described previously, use of a negative electrode mainly made of a silicon material, for use in a non-aqueous electrolyte secondary battery, has been considered to increase the capacity of the non-aqueous electrolyte secondary battery.

The non-aqueous electrolyte secondary battery using a silicon material is required to have the same cycle performance as a non-aqueous electrolyte secondary battery using a carbon material; however, no one has yet proposed a negative electrode material for this type of battery having the same cycle stability as a non-aqueous electrolyte secondary battery using a carbon material. In addition, a silicon compound especially containing oxygen has a lower initial efficiency than that of any carbon material, thereby limiting improvement in battery capacity.

In view of this, the present inventors diligently conducted study on a negative electrode active material that allows a non-aqueous secondary battery using a negative electrode made of this material to have good cycle performance and initial efficiency, bringing the present invention to completion.

The inventive negative electrode active material for a non-aqueous electrolyte secondary battery has negative electrode active material particles containing a silicon compound ($SiO_x$ where $0.5 \leq x \leq 1.6$). In the present invention, the negative electrode active material particles are coated with a carbon coating composed of a substance at least partially containing carbon, and the carbon coating has a density ranging from 1.2 $g/cm^3$ to 1.9 $g/cm^3$. Moreover, in the present invention, the negative electrode active material particles have a characteristic of type II or type III adsorption-desorption isotherm in the IUPAC classification, as obtained by adsorption-desorption isotherm measurement with nitrogen gas.

The inventive negative electrode active material achieves excellent conductivity by coating the negative electrode active material particles with the carbon coating composed of a substance at least partially containing carbon. When the density of the carbon coating exceeds 1.9 $g/cm^3$, the carbon coating on the silicon compound is excessively dense. This makes the silicon compound difficult to be impregnated with an electrolyte, resulting in degradation of battery performances such as cycle performance and initial charge and discharge performance. When the density is less than 1.2 $g/cm^3$, the negative electrode active material particles have a large specific surface area. This causes binders to be excessively adsorbed thereto and reduces effects of the binders in production of a negative electrode, resulting in degradation of battery performances. In addition, a type II or type III adsorption-desorption isotherm is given by negative electrode active material particles with non-porous surfaces. Such particles can minimize the consumption of binders used for producing a negative electrode and prevent excessive adsorption of the binders, thus enabling to effectively bind the silicon compound, which is largely expandable and shrinkable. Therefore, the inventive negative electrode active material can increase the battery capacity and improve the cycle performance and the battery initial efficiency.

<1. Negative Electrode for Non-Aqueous Electrolyte Secondary Battery>

A negative electrode for a non-aqueous electrolyte secondary battery using the inventive negative electrode material for a non-aqueous electrolyte secondary battery will be now described. FIG. 1 shows the cross-section of a negative electrode for a non-aqueous electrolyte secondary battery (also simply referred to as a negative electrode below) according to an embodiment of the invention.

[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in a negative electrode using the inventive negative electrode active material.

[Negative Electrode Current Collector]

The negative electrode current collector 11 is made of a highly conductive and mechanically strong material. Examples of the conductive material used for the negative electrode current collector 11 include copper (Cu) and nickel (Ni). Such conductive materials preferably have inability to form an intermetallic compound with lithium (Li).

The negative electrode current collector 11 preferably contains carbon (C) and sulfur (S) besides the main element because these elements improve the physical strength of the negative current collector. In particular, when the active material layer contains a material expandable at charging, the current collector containing the above elements can inhibit deformation of the electrodes and the current collector itself. The amount of the contained elements is preferably, but not particularly limited to, 100 ppm or less. This amount enables effective inhibition of the deformation.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains multiple negative electrode active material particles that can occlude and emit lithium ions and may further contain other materials such as a negative electrode binder or a conductive additive depending on battery design. The inventive negative electrode active material for a non-aqueous electrolyte secondary battery can be used for the negative electrode active material layer 12.

The negative electrode active material particles included in the inventive negative electrode active material each contain a silicon compound capable of occluding and emitting lithium ions.

The negative electrode active material particle included in the inventive negative electrode active material is a silicon oxide containing a silicon compound ($SiO_x$, where $0.5 \leq x \leq 1.6$). A preferable composition of the silicon compound is that x is close to 1. The reason is that this composition enables high cycle performance. The present invention does not necessarily intend a silicon material composition of 100% but permits a silicon material containing a minute amount of impurities.

As described above, the negative electrode active material particles included in the inventive negative electrode active material are coated with a carbon coating. The density of the carbon coating ranges from 1.2 $g/cm^3$ to 1.9 $g/cm^3$.

Furthermore, as described above, the negative electrode active material particles in the present invention have a characteristic of type II or type III adsorption-desorption isotherm in the IUPAC classification, as obtained by adsorption-desorption isotherm measurement with nitrogen gas.

Moreover, the negative electrode active material particles in the present invention preferably exhibit a resistivity ranging from $1.0 \times 10^{-2}$ Ω·cm to $1.0 \times 10^{1}$ Ω·cm when the particles are compressed to 1.5 $g/cm^3$. The negative electrode active material particles having a compression resistivity of $1.0 \times 10^{-2}$ Ω·cm or more have an appropriate conductivity and prevent deposition of lithium, thus improving the battery performances. When the compression resistivity is $1.0 \times 10^{1}$ Ω·cm or less, a sufficient conductivity is achieved, and thus the battery performances are improved.

The compression resistivity of the negative electrode active material particles can be measured, for example, under the following conditions.

Apparatus: Powder resistivity measurement system MCP-PD type, made by Mitsubishi Chemical Analytech Co., Ltd.

Four probe method

Charged amount: 1.5 g

Pressure and Measurement: A sample is pressed until the pressure reaches 20N while measuring the powder resistivity every 5N. Using the measurement values, a resistivity when the sample is compressed to 1.5 $g/cm^3$ is estimated by extrapolation.

Moreover, the negative electrode active material particles preferably have a specific surface area ranging from 1.0 $m^2/g$ to 15 $m^2/g$. When the specific surface area is 1.0 $m^2/g$ or more, a battery using this material can achieve a sufficient electrolyte impregnation, resulting in improved battery performances. When the specific surface area is 15 $m^2/g$ or less, an appropriate amount of binders are adsorbed to the negative electrode active material particles, and thus binding property is improved, resulting in improved battery performances. The specific surface area can be measured by the BET method at one position, for example.

Moreover, the negative electrode active material particles preferably have a negative zeta potential in a 0.1% carboxymethyl cellulose aqueous solution. Such particles can inhibit aggregation with other active materials when water slurry is formed for producing a negative electrode. Thus, the particles facilitates coating of the negative electrode and improve the battery performances.

The negative zeta potential can be measured by the following procedure, for example. First, 1% of the negative electrode active material particles containing the silicon compound with the carbon coating are added to a 0.1% carboxymethyl cellulose (CMC) aqueous solution. This mixture is stirred for 30 seconds with a hand mixer. Then, the resultant is placed in an ultrasonic bath for 10 minutes to measure electrophoretic mobility at 25° C. The zeta potential can be calculated from the measured electrophoretic mobility with the Smoluchowski equation.

Solution: 1% of negative electrode active material particles; 0.1% of a CMC aqueous solution (a usable CMC is, for example, CELLOGEN WS-C made by DKS Co., Ltd.)

Measurement Apparatus: ELSZ-1000Z made by Otsuka Electronics Co., Ltd.

Moreover, in the inventive negative electrode active material, the negative electrode active material particles preferably at least partially contain fibrous carbon components. The fibrous carbon components improve conductivity between the active materials, thereby improving the battery performances.

Moreover, in the inventive negative electrode active material, the negative electrode active material particles preferably at least partially contain agglomerated carbon components. The agglomerated carbon components improve conductivity around the active material, thereby improving the battery performances.

The fibrous carbon components and the agglomerated carbon components can be detected by compositional images with a scanning electron microscope (SEM) and local compositional analysis with an energy dispersive X-ray spectroscope (EDX).

The median size of the silicon compound contained in the negative electrode active material particles preferably ranges from 0.5 μm to 20 μm, but not particularly limited thereto. This range makes it easy to occlude and emit lithium ions and inhibits the breakage of the particles at charging and discharging. A median size of 0.5 μm or more then prevents the surface area from excessively increasing and can thus reduce the battery irreversible capacity; a median size of 20 μm or less inhibits the breakage of the particles and the creation of a new surface.

In the present invention, the silicon compound preferably exhibits a diffraction peak having a half width (2θ) of 1.2° or more that is attributable to a (111) crystal plane and obtained when X-ray diffraction is performed on the silicon compound, and a crystallite size of 7.5 nm or less that is attributable to the crystal plane. The silicon compound exhibiting such half width and crystallite size has low crystallinity. Use of the silicon compound having low crystallinity and few Si-crystallites enables the battery performances to be improved. In addition, the presence of the silicon compound having low crystallinity enables stable generation of a lithium compound.

Moreover, the silicon compound in the present invention preferably satisfies formula (1) of $5.0 \geq A/B \geq 0.01$ and $6.0 \geq (A+B)/C \geq 0.02$ where A is a peak area of an amorphous silicon region represented by a chemical shift value of $-20$ ppm to $-74$ ppm, B is a peak area of a crystalline silicon region represented by a chemical shift value of $-75$ ppm to $-94$ ppm, and C is a peak area of a silica region represented by a chemical shift value of $-95$ ppm to $-150$ ppm, in which the chemical shift value is obtained from a $^{29}$Si-MAS-NMR spectrum. The chemical shift is based on tetramethylsilane.

As the proportion of the amorphous silicon, which can inhibit the expansion due to the insertion of lithium, becomes higher, the expansion of the negative electrode is inhibited more effectively when used for a battery, so the cycle performance is improved. Moreover, the silicon compound satisfying formula (1) can inhibit the reduction in electronic conductivity in the silicon compound since the proportion of silica components is smaller than that of silicon components such as amorphous silicon and crystalline silicon, so that the battery performances can be improved.

$^{29}$Si-MAS-NMR spectrum can be measured, for example, under the following conditions.

$^{29}$Si-MAS-NMR (Magic Angle Spinning Nuclear Magnetic Resonance)
 Apparatus: a 700-NMR spectroscope made by Bruker Corp.
 Probe: a 4-mm-HR-MAS rotor, 50 μL
 Sample Rotation Speed: 10 kHz
 Temperature of Measurement Environment: 25° C.

As described above, the negative electrode active material particles in the present invention are at least partially coated with the carbon coating.

In the present invention, the carbon coating preferably exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of an intensity of the scattering peak at 1330 cm$^{-1}$ to that at 1580 cm$^{-1}$. This allows an optimum ratio of a carbon material with diamond structure to a carbon material with graphite structure in the carbon coating. Consequently, when the negative electrode active material containing the negative electrode active material particles having this carbon coating is used for a negative electrode of a non-aqueous electrolyte secondary battery, the non-aqueous electrolyte secondary battery can achieve good battery performances.

The Raman spectrometry will now be described in detail. The Raman spectrometry, micro-Raman analysis, enables calculation of the ratio of a carbon material with diamond structure (e.g., the carbon coating or a carbon-based material) to a carbon material with graphite structure, from Raman spectrum. More specifically, diamond exhibits a sharp peak at a Raman shift of 1330 cm$^{-1}$; graphite exhibits a sharp peak at a Raman shift of 1580 cm$^{-1}$. The ratio of the carbon material with diamond structure to one with graphite structure can be readily obtained from the ratio of the intensities of these peaks.

Diamond has high strength, high density, and are highly insulating; graphite is excellent in electrical conductivity. The carbon coating exhibiting the above intensity ratio makes the best use of both properties of these materials, thereby enabling the negative electrode to prevent from breaking due to the expansion and contraction of its material at charging and discharging. This negative electrode active material has conductive network.

Examples of a method of forming the carbon coating include coating the silicon compound with a carbon material (a carbon compound) such as graphite.

The amount of the carbon coating on the silicon compound preferably ranges from 0.1 mass % to 25 mass % with respect to the total amount of the silicon compound and the carbon coating. The amount of the carbon coating is more preferably from 4 mass % to 20 mass %.

When the amount is 0.1 mass % or more, the electronic conductivity can be reliably improved. When the amount is 25 mass % or less, the battery performances are improved, and the battery capacity is increased. The method of coating with a carbon compound is preferably, but not particularly limited to, sugar carbonization or pyrolysis of hydrocarbon gas. These methods can improve the coverage of the carbon coating on the surface of the silicon compound.

In the present invention, the average thickness of the carbon coating on the silicon compound preferably ranges from 5 nm to 500 nm. When the average thickness is 5 nm or more, a sufficient conductivity can be obtained, and the battery performances is improved with the improvement in conductivity. When the average thickness is 500 nm or less, the thickness of the carbon coating is 10 percent or less of the particle size of the silicon compound, and the proportion of the silicon compound in the negative electrode active material can be kept high. This enables a non-aqueous electrolyte secondary battery using this negative electrode active material to have an improved energy density. The average thickness of the carbon coating on the negative electrode active material particles can be measured by a cross-sectional observation with a focused ion beam-transmission electron microscope (FIB-TEM).

In the present invention, the average coverage of the carbon coating on the silicon compound is preferably 30% or more. When the average coverage is 30% or more, the carbon components can effectively improve conductivity in particular, thereby improving battery performances. The average coverage is defined as (carbon detected intensity)/(silicon detected intensity) on the surface by a local compositional analysis with a scanning electron microscope—energy dispersive X-ray spectroscope (SEM-EDX).

In the present invention, the carbon coating preferably exhibits fragments of $C_yH_z$ compound when subjected to TOF-SIMS, and a part of the fragments of $C_yH_z$ compound satisfies $6 \geq y \geq 2$ and $2y+2 \geq z \geq 2y-2$. The surface on which fragments of compound such as $C_yH_z$ compound are detected is compatible with a negative electrode binder such as CMC or polyimide, resulting in better battery performances.

In this case, especially, the ratio of a $C_4H_9$ detected intensity D to a $C_3H_5$ detected intensity E of the fragments of $C_yH_z$ compound exhibited by the carbon coating during the TOF-SIMS preferably satisfies $2.5 \geq D/E \geq 0.3$. When the intensity ratio D/E is 2.5 or less, electrical resistance of the surface is small, so that the conductivity and thus the battery performances are improved. When the intensity ratio D/E is 0.3 or more, a sufficient area of the surface is coated with the carbon coating. This carbon coating improves the conductivity over the entire surface, thereby improving the battery performances. The kind and the amount of the detected fragments of $C_yH_z$ compound can be adjusted by changing CVD conditions (e.g., gas and temperature) and post-treatment conditions.

TOF-SIMS may be carried out, for example, under the following conditions.

PHI TRIFT 2 made by ULVAC-PHI Inc.
Primary Ion Source: Ga
Sample Temperature: 25° C.
Accelerating Voltage: 5 kV
Spot Size: 100 μm×100 μm
Sputter: Ga; 100 μm×100 μm; 10 seconds
Negative Ion Mass Spectrum
Sample: pressed powder pellet Example of the negative electrode conductive additive include carbon materials such as carbon black, acetylene black, graphite such as flaky graphite, ketjen black, carbon nanotube, carbon nanofiber, and a combination thereof. These conductive additives are preferably particles having a median size smaller than that of the silicon compound.

In the present invention, the negative electrode active material layer 12 in FIG. 1 may include, in addition to the inventive negative electrode active material, a carbon material (a carbon-based active material). In this manner, the negative electrode active material layer 12 can reduce its electrical resistance and a stress due to its expansion at charging. Examples of the carbon-based active material include pyrolytic carbons, cokes, glassy carbon fiber, a fired organic polymeric compound, and carbon black. Above all, the carbon-based active material is preferably a graphite material. The graphite material can exhibit better initial efficiency and capacity retention rate than other carbon-based active materials.

In this case, the inventive negative electrode preferably includes the silicon compound with a proportion of 5 mass % or more with respect to the total amount of the carbon-based active material and the silicon compound. Moreover, the proportion of the silicon compound is preferably less than 90 mass %. Such a negative electrode for a non-aqueous electrolyte secondary battery prevents the reduction in initial efficiency and capacity retention rate.

The median size F of the carbon-based active material and the median size G of the silicon-based active material preferably satisfy 25≥F/G≥0.5. In other words, the median size of the carbon-based active material is desirably nearly equal to or larger than that of the silicon-based active material. The reason is that the breakage of the mixture layer can be prevented when the silicon compound, which may expand or contract due to insertion or extraction of lithium, is equal to or smaller than the carbon-based active material. Thus, as the carbon-based active material becomes large relative to the silicon compound, the volume density of the negative electrode at charging, the initial efficiency, and thus the battery energy density are improved.

The inventive negative electrode contains the inventive negative electrode active material. This negative electrode preferably has a charge and discharge capacity attributable to the carbon coating contained in the negative electrode active material. The charge and discharge capacity attributable to the carbon coating improves lithium ionic conductivity into the negative electrode active material particles, thus improving the battery performances.

The charge and discharge capacity of the carbon coating can be measured, for example, by the following procedure. First, the silicon compound having the carbon coating undergoes reaction in a 20% sodium hydroxide aqueous solution at 50° C. for 24 hours to remove silicon components. Then, a negative electrode is produced by using a mixture of carboxymethyl cellulose (CMC) and styrene-butadiene rubber (also referred to as SBR, below) as a binder. With this negative electrode and a lithium counter electrode, a coin cell is produced to measure its charge and discharge capacity, whereby the charge and discharge capacity of the carbon coating can be measured.

In the inventive negative electrode, the negative electrode active material preferably at least partially containing lithium. Lithium may be contained in the negative electrode active material by doping the silicon compound with lithium. An exemplary method for doping the silicon compound with lithium include a thermal doping method in which the silicon compound and metallic lithium are mixed and then heated, and an electrochemical method. When the silicon compound contains a lithium compound, the initial efficiency is improved. Consequently, discharging cutoff voltage of the negative electrode used in a non-aqueous electrolyte secondary battery is reduced, and the retention rate is thus improved.

The negative electrode active material layer 12 in FIG. 1 may be formed by, for example, an application method. The application method is to mix the negative electrode active material particles, the binders, etc., in addition to the conductive additive and the carbon material as needed, and disperse the mixture into an organic solvent or water to apply the resultant to a subject.

[Method of Producing Negative Electrode]

The method of producing a negative electrode will be described.

The method of producing a negative electrode material contained in the negative electrode will be now described. The method begins with a production of a silicon compound expressed by $SiO_x$ (0.5≤x≤1.6). The silicon compound is then coated with a carbon coating. The silicon compound may be modified by inserting lithium into the silicon compound and thereby forming a lithium compound on its surface, in its interior, or both sites. Then, the silicon compound is selected if the compound has the carbon coating with a density ranging from 1.2 g/cm$^3$ to 1.9 g/cm$^3$ and has a characteristic of type II or type III adsorption-desorption isotherm in the IUPAC classification as obtained by adsorption-desorption isotherm measurement with nitrogen gas. Using the selected silicon compound coated with the carbon coating as the negative electrode active material particles, the negative electrode material for a non-aqueous electrolyte secondary battery is produced.

More specifically, the negative electrode material can be produced by, for example, the following procedure.

First, a raw material (material to be vaporized) capable of generating a silicon oxide gas is heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an adsorption plate. The temperature in the reactor is decreased to 100° C. or less, and a deposit is taken out. The deposit is then pulverized with a ball mill or a jet mill to form powder.

The obtained powder material is coated with a carbon coating. Thermal CVD is desirably used to form the carbon coating on the obtained powder material. This thermal CVD is to fill a furnace in which the powder material is placed with a hydrocarbon gas and heat the interior of the furnace.

The pyrolysis temperature is preferably, but not particularly limited to, 1200° C. or less, more preferably 950° C. or less. This temperature range enables the inhibition of an unintended disproportionation of the active material particles.

The thermal CVD to form the carbon coating can be performed, for example, while temperature in the furnace are adjusted. This adjustment allows the carbon coating on the powder material to have a desired peak intensity ratio $I_{1330}/I_{1580}$ in Raman spectrum. In addition, the amount, the thickness, and the coverage of the carbon coating, the classification of the adsorption-desorption isotherm, and the specific surface area can be controlled by adjusting CVD temperature, time, and degree of stirring the powder material (silicon compound powder) during CVD.

Then, the silicon compound is selected if the compound has the carbon coating with a density ranging from 1.2 g/cm³ to 1.9 g/cm³ and has a characteristic of type II or type III adsorption-desorption isotherm in the IUPAC classification as obtained by adsorption-desorption isotherm measurement with nitrogen gas.

Figure 3:
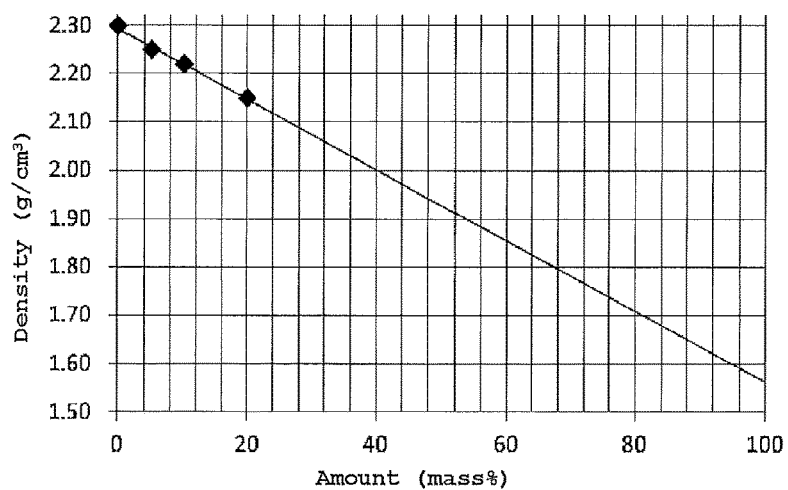
FIG. 3 is a plot for estimating the density of the carbon coating of the silicon compound in the present invention.

The density of the carbon coating can be estimated, for example as shown in FIG. 3, by plotting the amount of the carbon coating (mass %) with respect to the total amount of the silicon compound and the carbon coating against the density of the particles composed of the silicon compound and the carbon coating, and determining a point where the amount of the carbon coating is 100 mass % by extrapolation from a linear approximation to calculate the density of the carbon coating alone.

The adsorption-desorption isotherm can be measured by adsorbing and desorbing an adsorbed molecule (nitrogen) to an adsorbent (the negative electrode active material particles). A usable measurement apparatus is, for example, BELSORP-mini, made by Microtrac BEL corp. In case that hysteresis of adsorption and desorption of nitrogen appears, a maximum hysteresis difference $\Delta V$ in adsorbed nitrogen amount between adsorption and desorption at the same pressure is compared with an adsorbed nitrogen amount V at $p/p^{o}=0.9$. When $\Delta V/V \leq 0.05$, the hysteresis is considered to be caused by measurement error and substantially ignored to classify the adsorption-desorption isotherm as type II or type III. Here, $p/p^{o}$ is a relative pressure obtained by dividing equilibrium pressure by saturated vapor pressure.

An exemplary method of classifying negative electrode active material particles having different types of adsorption-desorption isotherm is as follows. In case that negative electrode active material particles are classified into Type II or Type IV, first, powder of the negative electrode active material particles is allowed to stand under environment with a humidity of 80% for 10 hours (while the powder is stirred 3 times or more). The powder is then put into a cylindrical container such that the bulk density of the powder is 5% of the volume of the container. The cylindrical container is stirred for 2 hours and allowed to stand until the powder is deposited; this procedure is repeated twice. The upper 20% (Type II) and the lower 20% (Type IV) of the deposited powder are separated, thereby classifying the powder into Type II or Type IV.

Using the selected silicon compound coated with the carbon coating as the negative electrode active material particles, the negative electrode material for a non-aqueous electrolyte secondary battery is produced.

Subsequently, the negative electrode active material is mixed with a negative electrode binder and other materials such as conductive additives. The resultant negative electrode mixture is then mixed with a solvent such as an organic solvent or water to form slurry.

The slurry of the negative electrode mixture is applied to the surface of a negative electrode current collector and dried to form a negative electrode active material layer 12 shown in FIG. 1. At this time, heating press may be performed, if necessary. In this manner, the negative electrode can be produced.

If a carbon-based material having a median size smaller than that of the silicon compound is added as the conductive additive, for example, acetylene black may be selected.

The hydrocarbon gas preferably has a composition of $C_nH_m$ where $3 \geq n$, but is not particularly limited thereto, for this composition enables the reduction in production cost and improvement in physical properties of a pyrolysis product.

<2. Lithium-Ion Secondary Battery>

A lithium-ion secondary battery using the above-described negative electrode will now be described.

[Configuration of Laminate Film Secondary Battery]

Figure 2:
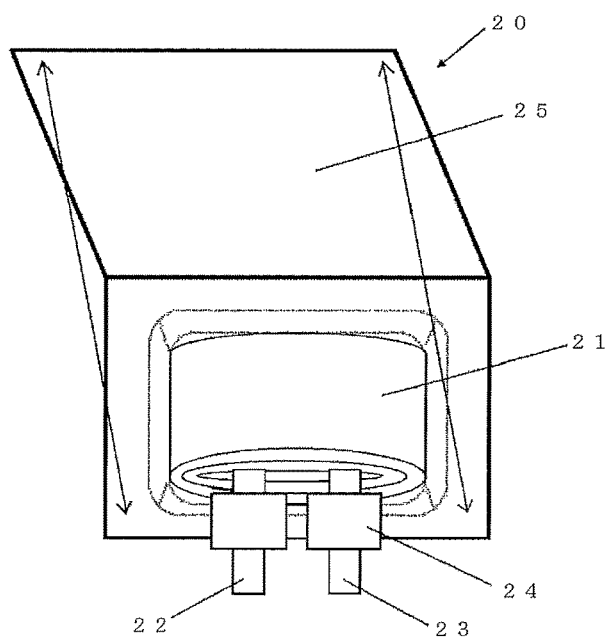
FIG. 2 is an exploded view of a configuration of a secondary battery of laminate film type according to an embodiment of the invention.

The laminate film secondary battery 20 shown in FIG. 2 includes a wound electrode body 21 interposed between sheet-shaped outer parts 25. The wound body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive electrode lead 22 attached to the positive electrode and a negative electrode lead 23 attached to the negative electrode. The outermost circumference of the electrode bodies is protected by a protecting tape.

The positive electrode lead and the negative electrode lead, for example, extends from the interior of the outer parts 25 toward the exterior in one direction. The positive electrode lead 22 is made of, for example, a conductive material such as aluminum; the negative electrode lead 23 is made of, for example, a conductive material such as nickel or copper.

An example of the outer part 25 is a laminate film composed of a fusion-bond layer, a metallic layer, and a surface protecting layer stacked in this order. Two laminate films are fusion-bonded or stuck with an adhesive at the outer edges of their fusion-bond layers such that each fusion-bond layer faces the electrode body 21. The fusion-bond layer may be, for example, a film such as a polyethylene or polypropylene film; the metallic layer may be aluminum foil; the protecting layer may be, for example, nylon.

The space between the outer parts 25 and the positive and negative electrode leads is filled with close adhesion films 24 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10, for example, shown in FIG. 1.

The positive electrode current collector is made of, for example, a conductive material such as aluminum.

The positive electrode active material layer contains a positive electrode material that can occlude and emit lithium ions or a combination of positive electrode materials, and may contain a binder, a conductive additive, a dispersing agent, or other materials according to design. The same detailed description as described for the negative electrode binders and negative electrode conductive additive, for example, is then given for this binder and this conductive additive.

The positive electrode material is preferably a compound containing lithium. Examples of the lithium-containing compound include a complex oxide composed of lithium and transition metal elements, and a phosphoric acid compound containing lithium and transition metal elements. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide containing lithium and transition metal elements include a lithium cobalt complex oxide ($Li_xCoO_2$), a lithium nickel complex oxide ($Li_xNiO_2$). Examples of the phosphoric acid compound containing lithium and transition metal elements include a lithium iron phosphoric acid compound ($LiFePO_4$), a lithium iron manganese phosphoric acid compound ($LiFe_{1-u}Mn_uPO_4$ (u<1)). Use of these positive electrode materials enables a higher battery capacity and excellent cycle performance.

[Negative Electrode]

The negative electrode is configured as in the above negative electrode 10 for a lithium-ion secondary battery shown in FIG. 1, and, for example, has the negative electrode active material layer 12 disposed on both faces of the current collector 11. The negative electrode preferably has a negative electrode charge capacity larger than a battery charge capacity (electrical capacitance) provided by the positive electrode active material, for this negative electrode itself can inhibit the deposition of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

This non-facing area, i.e., the area at which the positive and negative electrode active material layers do not face one another is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran.

Among them, ethylene carbonate, propylene carbonate, dimethyl carbonate, diethyl carbonate, or ethylmethyl carbonate, or a combination thereof is preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such solvents improve the dissociation of electrolyte salt and ionic mobility.

The solvent preferably contains an unsaturated carbon bond cyclic carbonate as an additive, for this enables formation of a stable coating on a negative electrode at charging and discharging and inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg to 2.5 mol/kg. This content enables high ionic conductivity.

[Manufacturing Method of Laminate Film Lithium-Ion Secondary Battery]

Firstly, a positive electrode is produced with the above positive electrode material as follows. A positive electrode mixture is created by mixing the positive electrode material with as necessary a binder, a conductive additive, and other materials, and dispersed in an organic solvent to form slurry of the positive electrode mixture. This slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression and heating may be repeated multiple times.

Secondly, a negative electrode active material layer is formed on a negative electrode current collector to produce a negative electrode through the same procedure as in the above production of the negative electrode 10 for a lithium-ion secondary battery.

The positive electrode and the negative electrode are produced in the same way as above. In this case, the active material layers are formed on both faces of the positive and negative electrode current collectors. In both the electrodes, the length of these active material layers formed on the faces may differ from one another (See FIG. 1).

Then, an electrolyte is prepared. With ultrasonic welding, the positive electrode lead 22 is attached to the positive electrode current collector, and the negative electrode lead 23 is attached to the negative electrode current collector. The positive and negative electrodes and the separator interposed therebetween are stacked or wound to produce the electrode body and a protecting tape is stuck to the outermost circumference of the body. The electrode body is flattened. The film-shaped outer part 25 is folded in half to interpose the electrode body therebetween. The insulating portions of the outer parts are stuck to one another by heat sealing such that one of the four sides is opened to house the electrode body. The close adhesion films 24 are inserted between the outer part 25 and the positive and negative electrode leads 22, 23. The above prepared electrolyte is introduced from the open side in a prescribed amount for impregnation of the electrolyte under a vacuum. After impregnation, the open side is stuck by vacuum heat sealing.

In this manner, the laminate film secondary battery 20 can be produced.

EXAMPLE

The present invention will be more specifically described below with reference to examples and comparative examples, but the present invention is not restricted to these examples.

Example 1-1

The laminate film secondary battery 20 shown in FIG. 2 was produced by the following procedure.

The procedure began with the production of a positive electrode. Positive electrode active materials of 95 mass parts of $LiCoO_2$ (lithium cobalt complex oxide), 2.5 mass parts of positive electrode conductive additive, and 2.5 mass parts of positive electrode binders (polyvinylidene fluoride, PVDF) were mixed to produce a positive electrode mixture. The positive electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector had a thickness of 15 µm. The resultant was finally compressed with a roll press.

Secondly, a negative electrode was produced. For the production of a negative electrode active material, a mixed raw material of metallic silicon and silicon dioxide was first placed in a reactor to obtain deposit under a vacuum of 10 Pa. The deposit was sufficiently cooled and then taken out to pulverize it with a ball mill. After adjusting the particle size of the obtained powder, a carbon coating was formed thereon by thermal CVD. The produced powder was bulk-modified by the electrochemical method in a mixed solvent having a propylene-carbonate-to-ethylene-carbonate volume ratio of 1:1, including 1.3 mol/kg of lithium hexafluorophosphate ($LiPF_6$) as electrolyte salt. The resultant material was dried in a carbon dioxide atmosphere.

Then, the negative electrode active material, a precursor of negative electrode binder (polyamic acid), a first conductive additive (flaky graphite), and a second conductive additive (acetylene black) were mixed at a dry-weight ratio of 80:8:10:2. The mixture was diluted with NMP to form paste slurry of a negative electrode mixture. NMP was used as a solvent for the polyamic acid. The negative electrode mixture slurry was then applied to both surfaces of a negative electrode current collector with a coating apparatus and dried. The negative electrode current collector used was an electrolytic copper foil, having a thickness of 15 µm. The resultant negative electrode current collector was finally fired under a vacuum at 400° C. for 1 hour. A negative electrode binder (polyimide) was thereby formed.

A solvent was produced by mixing 4-fluoro-1,3-dioxolan-2-one (FEC), ethylene carbonate (EC), and dimethyl carbonate (DMC) and an electrolyte salt (lithium hexafluorophosphate, $LiPF_6$) was dissolved therein to prepare an electrolyte. The composite of the solvent was FEC:EC:DMC=10:20:70 in term of the volume. The content of the electrolyte salt in the solvent was 1.2 mol/kg.

The secondary battery was assembled by the following procedure. An aluminum lead was first ultrasonic-welded to one end of the positive electrode current collector. A nickel lead was welded to one end of the negative electrode current collector. The positive electrode, a separator, the negative electrode, a separator were then stacked in this order and wound in a longitudinal direction to obtain a wound electrode body. The end of the wound part was fixed by a PET protecting tape. The separators were a 12-µm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The prepared electrolyte was poured from the open side to perform the impregnation of the electrolyte under a vacuum. The open side was stuck by heat sealing.

Examples 1-2 to 1-5, Comparative Examples 1-1 and 1-2

A secondary battery was produced as in example 1-1 except that the amount of oxygen was adjusted in the silicon compound expressed by $SiO_x$.

The silicon compounds in examples 1-1 to 1-5 and comparative examples 1-1 and 1-2 had the following physical properties: the peak area ratio of the silicon compound was A/B=0.6 and (A+B)/C=0.32, as obtained by $^{29}Si$-MAS-NMR spectrum; the silicon compound had a median size $D_{50}$ of 5.1 µm; the half width (2θ) of the diffraction peak attributable to a (111) crystal plane and obtained by X-ray diffraction was 1.85°; the crystallite size attributable to the (111) crystal plane was 4.62 nm.

Moreover, in examples 1-1 to 1-5 and comparative examples 1-1 and 1-2, the amount of the carbon coating was 5%; the average thickness of the carbon coating was 110 nm; the average coverage of the carbon coating was 90%; the density of the carbon coating was 1.6 g/cm³; the charge and discharge capacity of the carbon coating was 280 mAh/g; the intensity ratio $I_{1330}/I_{1580}$ in Raman spectrum was 1.1; the carbon coating exhibited fragments of $C_yH_z$ compound where y=2, 3, 4, z=2y−3, 2y−1, and 2y+1, when subjected to TOF-SIMS; the ratio D/E of the $C_4H_9$ detected intensity D to the $C_3H_5$ detected intensity E was 0.8; the carbon coating contained fibrous carbon components and agglomerated carbon components.

The adsorption-desorption isotherm of the above negative electrode active material particles had a characteristic of type II in the IUPAC classification. Moreover, the negative electrode active material particles exhibited a resistivity (at 1.5 g/cm$^3$) of 0.12 Ω·cm, and a negative zeta potential of −50 mV in a 0.1% CMC aqueous solution. Moreover, the specific surface area was 5.1 m$^2$/g, as measured by the BET method.

The cycle performance (retention rate %) and the first charge and discharge performance (initial efficiency %) of the secondary batteries in examples 1-1 to 1-5 and comparative examples 1-1 and 1-2 were investigated. The result is given in Table 1.

The cycle performance was investigated in the following manner. First, two cycles of charging and discharging were performed at 25° C. to stabilize the battery, and the discharge capacity in the second cycle was measured. Next, the cycle of charging and discharging was repeated until the total number of cycles reached 100 cycles, and the discharge capacity was measured every cycle. Finally, the capacity retention rate was calculated by dividing the discharge capacity in the 100-th cycle by the discharge capacity in the second cycle and multiplying the resultant by 100 to express as a percent. The cycle conditions were as follows: The secondary batteries were charged with a constant current density of 2.5 mA/cm$^2$ until the voltage reached 4.3V. After this voltage reached 4.3V, the charging was continued while the current density became 0.25 mA/cm$^2$ at a constant voltage of 4.3V. The batteries were then discharged with a constant current density of 2.5 mA/cm$^2$ until the voltage reached 3.0V.

The first charge and discharge performance was calculated by the following expression:

Initial Efficiency (%)=(First Discharge Capacity/First Charge Capacity)×100

The atmosphere temperate was the same as the cycle performance was investigated. The charging and discharging conditions were 0.2 times the conditions of the investigation of the cycle performance. More specifically, the secondary batteries were charged with a constant current density of 0.5 mA/cm$^2$ until the voltage reached 4.3V. After this voltage reached 4.3V, the charging was continued while the current density became 0.05 mA/cm$^2$ at a constant voltage of 4.3V. The batteries were then discharged with a constant current density of 0.5 mA/cm$^2$ until the voltage reached 3.0V.

Tables 1 to 9 show the retention rate and the initial efficiency of the batteries using, as the negative electrode active material, the silicon compound having carbon coating but no carbon-based active material, such as natural graphite (having an average size of 20 μm, for example). In other words, the retention rate and the initial efficiency based on the silicon compound are shown in Tables 1 to 9. This allowed the observation of variations in retention rate and initial efficiency only depending on differences of the silicon compound (oxygen amount, crystallinity, median size, etc.) or the carbon coating (content, composition, etc.).

[Table 1]
NMR: A/B=0.6, (A+B)/C=0.32, D$_{50}$=5.1 μm, Carbon coating: Density 1.6 g/cm$^3$, Amount 5%, Average thickness 110 nm, Coverage 90%, Charge and discharge capacity 280 mAh/g, Absorption-desorption isotherm: Type II, BET specific surface area=5.1 m$^2$/g, Compression resistivity (at 1.5 g/cm$^3$)=0.12 Ω·cm, Raman I$_{1330}$/I$_{1580}$=1.1, Carbon components: agglomerated carbon components and fibrous carbon components, TOF-SIMS C$_y$H$_z$ y=2, 3, 4 z=2y−3, 2y−1, 2y+1, D/E=0.8, Zeta potential=−50 mV, Half width (2θ)= 1.85°, Si(111) crystallite size 4.62 nm, FEC:EC:DMC (1:2:7 volume ratio) LiPF$_6$ 1.2 mol/kg, Positive electrode LiCoO$_2$

TABLE 1

|  | x-value of SiO$_x$ | Initial efficiency (%) | Retention rate (%) |
|---|---|---|---|
| Comparative example 1-1 | 0.3 | 64.4 | 75.0 |
| Example 1-1 | 0.5 | 76.8 | 72.2 |
| Example 1-2 | 0.7 | 78.2 | 70.1 |
| Example 1-3 | 0.9 | 80.1 | 68.0 |
| Example 1-4 | 1.2 | 80.1 | 67.7 |
| Example 1-5 | 1.6 | 80.2 | 67.2 |
| Comparative example 1-2 | 1.8 | — | — |

As shown in Table 1, the silicon compounds expressed by SiO$_x$ having an x value out of 0.5≤x≤1.6 were deteriorated in the battery performances. In comparative example 1-1, for example, although the initial efficiency was improved, the battery retention rate significantly degraded because of lack of the oxygen amount (x=0.3). In comparative example 1-2, on the other hand, the measurement was impossible because both the retention rate and the initial efficiency degraded due to the reduction in conductivity caused by a large amount of oxygen (x=1.8).

Examples 2-1 to 2-7, Comparative Example 2-1 to 2-3

A secondary battery was produced as in example 1-3 except that the density, the amount, the average thickness, and the average coverage of the carbon coating on the silicon compound, and the IUPAC classification of absorption-desorption isotherm and the specific surface area of the negative electrode active material particles were changed. The density, the amount, the average thickness, and the average coverage of the carbon coating on the silicon compound, and the IUPAC classification of absorption-desorption isotherm and the specific surface area of the negative electrode active material particles were changed by controlling CVD temperature, time, and degree of stirring the silicon compound powder during CVD.

The cycle performance and the first charge and discharge performance of the secondary batteries in examples 2-1 to 2-7 and comparative examples 2-1 to 2-3 were investigated. The result is given in Table 2.

TABLE 2

SiOx (x = 0.9), $D_{50}$ = 5.1 μm, NMR: A/B = 0.6, (A + B)/C = 0.32,
Compression resistivity (at 1.5 g/cm³) = 0.12 Ω · cm, Raman $I_{1330}/I_{1580}$ = 1.1,
Carbon components: agglomerated carbon components and fibrous carbon
components, TOF-SIMS $C_yH_z$ y = 2,3,4 z = 2y − 3, 2y − 1, 2y + 1, D/E = 0.8, Zeta
potential = −50 mV, Half width (2θ) = 1.85°, Si (111) crystallite size
4.62 nm, FEC:EC:DMC (1:2:7 volume ratio) $LiPF_6$ 1.2 mol/kg, Positive
electrode $LiCoO_2$

| | Amount (mass %) | Carbon coating average thickness (nm) | Average coverage (%) | Carbon coating average density (g/cm³) | Absorption-desorption isotherm in IUPAC classification | Specific surface area (BET method) (m²/g) | Initial efficiency (%) | Retention rate (%) |
|---|---|---|---|---|---|---|---|---|
| Example 1-3 | 5 | 80 | 90% | 1.6 | II | 5.1 | 68.0 | 80.1 |
| Comparative example 2-1 | 5 | 115 | 70% | 2.15 | II | 0.7 | 66.5 | 65.5 |
| Comparative example 2-2 | 5 | 160 | 95% | 1.1 | IV | 20 | 66.1 | 70.4 |
| Example 2-1 | 2 | 50 | 25% | 1.6 | II | 4 | 66.7 | 71.2 |
| Example 2-2 | 2 | 40 | 20% | 1.7 | II | 2.2 | 68.5 | 67.7 |
| Example 2-3 | 6 | 125 | 97% | 1.6 | III | 4.3 | 66.3 | 70.8 |
| Example 2-4 | 10 | 220 | 100% | 1.6 | II | 5.5 | 67.9 | 80.1 |
| Example 2-5 | 20 | 420 | 100% | 1.6 | II | 9 | 68.0 | 78.5 |
| Example 2-6 | 20 | 420 | 100% | 1.6 | II | 15 | 67.1 | 76.2 |
| Example 2-7 | 30 | 600 | 100% | 1.6 | II | 17 | 66.1 | 72.1 |
| Comparative example 2-3 | 50 | 650 | 100% | 1.6 | IV | 20 | 65.5 | 67.8 |

As shown in Table 2, when the adsorption-desorption isotherm had a characteristic of type II or type III, the battery performances were improved. The reason is that the particles having non-porous surfaces minimized the consumption of the binders, enabling to effectively bind the silico-based active material, which was largely expandable and shrinkable. Moreover, when the density of the carbon coating was more than 1.9 g/cm³ (comparative example 2-1) or less than 1.2 g/cm³ (comparative example 2-2), the battery performances degraded.

In addition, when the amount of the carbon coating ranged from 0.1 mass % to 25 mass %, particularly from 4 mass % to 20 mass %, both the retention rate and the initial efficiency were improved. The reason why the better retention rate and initial efficiency were obtained in the above range is that when the amount of the carbon coating was 0.1 mass % or more, the electrical conductivity of the negative electrode active material particles could be improved as well as when the amount was 25 mass % or less, the degradation of the ionic conductivity could be prevented. Moreover, a preferable thickness of the carbon coating was 500 nm or less. Moreover, when the average coverage was 30% or more, the carbon components effectively improved the conductivity, and thus the battery performances were improved. Moreover, when the specific surface area ranged from 1.0 m²/g to 15 m²/g, better performances were obtained.

Examples 3-1 to 3-6

A secondary battery was produced as in example 1-3 except that the ratio between Si components and $SiO_2$ components (the ratio between Si and silica) in the silicon compound and the degree of disproportionation were changed. The ratio between Si components and $SiO_2$ components was changed in examples 3-1 to 3-6 by changing the amount of metallic silicon and silica used for SiO production. The ratio A/B in the silicon compound ($SiO_x$) was adjusted by a heat treatment to control the degree of disproportionation, where A was the peak area of an amorphous silicon (a-Si) region represented by a chemical shift value of −20 ppm to −74 ppm, B was the peak area of a crystalline silicon (c-Si) region represented by a chemical shift value of −75 ppm to −94 ppm, as obtained from $^{29}$Si-MAS-NMR spectrum.

The cycle performance and the first charge and discharge performance of the secondary batteries in examples 3-1 to 3-6 were investigated. The result is given in Table 3.

TABLE 3

SiOx (x = 0.9), Carbon coating: Density 1.6 g/cm³,
Amount 5%, Average thickness 110 nm, Coverage 90%, Charge
and discharge capacity 280 mAh/g, Absorption-desorption
isotherm: Type II, BET specific surface area = 5.1 m²/g,
Compression resistivity (at 1.5 g/cm³) = 0.12 Ω · cm,
Raman $I_{1330}/I_{1580}$ = 1.1, Carbon components: agglomerated
carbon components and fibrous carbon components,
TOF-SIMS $C_yH_z$ y = 2,3,4 z = 2y − 3, 2y − 1,2y + 1, D/E = 0.8,
Zeta potential = −50 mV, Half width (2θ) = 1.85°,
Si (111) crystallite size 4.62 nm, FEC:EC:DMC (1:2:7 volume
ratio) $LiPF_6$ 1.2 mol/kg, Positive electrode $LiCoO_2$

| | NMR | | Initial efficiency | Retention rate |
|---|---|---|---|---|
| | A/B | (A + B)/C | (%) | (%) |
| Example 3-1 | 0.3 | 6.2 | 69.2 | 76.5 |
| Example 3-2 | 0.002 | 1.5 | 67.1 | 78.8 |
| Example 1-3 | 0.6 | 0.32 | 68.0 | 80.1 |
| Example 3-3 | 0.769 | 0.32 | 67.7 | 80.3 |
| Example 3-4 | 1.6 | 0.33 | 67.2 | 80.0 |
| Example 3-5 | 5.5 | 0.42 | 68.5 | 77.3 |
| Example 3-6 | 0.54 | 0.01 | 66.2 | 76.9 |

As shown in Table 3, examples 1-3, 3-3, and 3-4, which satisfied 5.0≥A/B≥0.01 and 6.0≥(A+B)/C≥0.02 demonstrated that both the retention rate and the initial efficiency were improved. The reason is that an increase in a-Si component reduced the initial efficiency and improved the retention rate, thereby balancing the rate within the range of 5.0≥A/B≥0.01. When the ratio between Si components and $SiO_2$ components, i.e., (A+B)/C was 6 or less, the expansion due to the insertion of lithium could be inhibited, and the retention rate was improved. When the ratio (A+B)/C was 0.02 or more, the conductivity was improved, and thus the retention rate and the initial efficiency were improved. Examples 3-1 and 3-6, which satisfied only 5.0≥A/B≥0.01, were slightly inferior in the initial efficiency and the retention rate to the examples in which both A/B and (A+B)/C satisfied the above ranges. Examples 3-2 and 3-5, which satisfied only 6.0≥(A+B)/C≥0.02, were slightly inferior in the retention rate to the examples in which both A/B and (A+B)/C satisfied the above ranges.

Examples 4-1 to 4-5

A secondary battery was produced as in example 1-3 except that the crystallinity of the silicon compound was changed. The crystallinity can be controlled by a heat treatment under a non-atmospheric condition. Although example 4-1 exhibited a crystallite size of 1.542 nm, this value was obtained by fitting with analysis software because the peak value was not obtained. The silicon compound in examples 4-1 was substantially amorphous.

The cycle performance and the first charge and discharge performance of the secondary batteries in examples 4-1 to 4-5 were investigated. The result is given in Table 4.

TABLE 4

SiO$x$ (x = 0.9), $D_{50}$ = 5.1 μm, NMR: A/B = 0.6,
(A + B)/C = 0.32, Carbon coating: Density 1.6 g/cm$^3$,
Amount 5%, Average thickness 110 nm, Coverage 90%, Charge and discharge capacity 280 mAh/g, Absorption-desorption isotherm: Type II, BET specific surface area = 5.1 m$^2$/g,
Compression resistivity (at 1.5 g/cm$^3$) = 0.12 Ω · cm,
Raman $I_{1330}/I_{1580}$ = 1.1, Carbon components: agglomerated carbon components and fibrous carbon components,
TOF-SIMS $C_yH_z$ y = 2,3,4 z = 2y − 3, 2y − 1, 2y + 1, D/E = 0.8,
Zeta potential = −50 mV, FEC:EC:DMC (1:2:7 volume ratio) LiPF$_6$ 1.2 mol/kg, Positive electrode LiCoO$_2$

| | Half width (2θ) (°) | Si (111) crystallite size (nm) | Initial efficiency (%) | Retention rate (%) |
|---|---|---|---|---|
| Example 4-1 | 10.123 | 1.542 | 67.7 | 80.5 |
| Example 4-2 | 2.257 | 3.77 | 67.8 | 80.4 |
| Example 1-3 | 1.845 | 4.62 | 68.0 | 80.1 |
| Example 4-3 | 1.271 | 6.63 | 68.2 | 79.7 |
| Example 4-4 | 0.796 | 10.84 | 68.3 | 79.2 |
| Example 4-5 | 0.756 | 11.42 | 68.6 | 78.8 |

As shown in Table 4, the capacity retention rate and the initial efficiency changed in response to the variation in the crystallinity of the silicon compound. In particular, a high initial efficiency was obtained by low crystallinity materials with a crystallite size of 7.5 nm or less, which is attributable to an Si(111) plane. The best performance was obtained when the silicon compound was amorphous.

Examples 5-1 to 5-3

A secondary battery was produced as in example 1-3 except that the surface condition of the negative electrode active material particles was changed to adjust the intensity ratio $I_{1330}/I_{1580}$ of the scattering peaks at 1330 cm$^{-1}$ and 1580 cm$^{-1}$ of the carbon coating measured in the Raman spectrometry and the charge and discharge capacity of the carbon components. The adjustment of the intensity ratio $I_{1330}/I_{1580}$ and the charge and discharge capacity of the carbon coating was performed by changing the temperature and the gas pressure during CVD.

The cycle performance and the first charge and discharge performance of the secondary batteries in examples 5-1 to 5-3 were investigated. The result is given in Table 5.

TABLE 5

SiO$x$ (x = 0.9), $D_{50}$ = 5.1 μm, NMR: A/B = 0.6,
(A + B)/C = 0.32, Carbon coating: Density 1.6 g/cm$^3$,
Amount 5%, Average thickness 110 nm, Coverage 90%,
Absorption-desorption isotherm: Type II, BET specific surface area = 5.1 m$^2$/g, Compression resistivity (at 1.5 g/cm$^3$) = 0.12 Ω · cm, Carbon components: agglomerated carbon components and fibrous carbon components, TOF-SIMS $C_yH_z$ y = 2,3,4 z = 2y − 3, 2y − 1, 2y + 1, D/E = 0.8, Zeta potential = −50 mV, Half width (2θ) = 1.85°, Si (111) crystallite size 4.62 nm, FEC:EC:DMC (1:2:7 volume ratio) LiPF$_6$ 1.2 mol/kg, Positive electrode LiCoO$_2$

| | Intensity ratio $I_{1330}/I_{1580}$ | Charge and discharge capacity of carbon coating (mAh/g) | Initial efficiency (%) | Retention rate (%) |
|---|---|---|---|---|
| Example 5-1 | 2.2 | 380 | 67.1 | 77.8 |
| Example 1-3 | 1.1 | 280 | 68.0 | 80.1 |
| Example 5-2 | 0.85 | 265 | 68.2 | 77.1 |
| Example 5-3 | 0.6 | — | 68.2 | 76.9 |

As shown in Table 5, when the intensity ratio $I_{1330}/I_{1580}$ of the scattering peaks was less than 2.0 in the Raman spectrum, the retention rate and the initial efficiency were improved because the particles had few carbon components having disordered bond attributable to $I_{1330}$ on their surface and electrical conductivity was high. When the ratio $I_{1330}/I_{1580}$ was more than 0.7, the capacity retention rate was improved because the particles had few carbon components such as graphite attributable to $I_{1580}$ on their surface, resulting in improvement of the ionic conductivity and the expandability of the carbon coating corresponding to the expansion of the silicon compound due to the insertion of lithium. Moreover, examples 1-3, 5-1, and 5-2, in which the carbon coating had a charge and discharge capacity, demonstrated the improvement of lithium ionic conductivity into the negative electrode active material particles and thus the improvement of retention rate.

Examples 6-1 to 6-6 and Comparative Examples 6-1 and 6-2

A secondary battery was produced as in example 1-3 except that conditions of the carbon coating on the silicon compound were adjusted. More specifically, examples 6-1 to 6-6 varied in the $C_yH_z$ fragments exhibited by the carbon coating through TOF-SIMS, the ratio D/E between $C_4H_9$ detected intensity D and $C_3H_5$ detected intensity E in TOF-SIMS, and the zeta potential. These conditions were changed by adjusting gas species used in CVD of the silicon compound, CVD temperature, and temperature during post-CVD treatment. Moreover, the silicon compound was fired in an ammonia gas such that negative electrode active material particles had a positive zeta potential. In comparative examples 6-1 and 6-2, the silicon compound was not coated with the carbon coating.

The cycle performance and the first charge and discharge performance of the secondary batteries in examples 6-1 to 6-6 and comparative examples 6-1 and 6-2 were investigated. The result is given in Table 6.

TABLE 6

SiOx (x = 0.9), $D_{50}$ = 5.1 μm, NMR: A/B = 0.6, (A + B)/C = 0.32, Carbon coating: Density 1.6 g/cm$^3$, Amount 5%, Average thickness 110 nm, Coverage 90%, Charge and discharge capacity 280 mAh/g, Absorption-desorption isotherm: Type II, BET specific surface area = 5.1 m$^2$/g, Compression resistivity (at 1.5 g/cm$^3$) = 0.12 Ω · cm, Raman $I_{1330}/I_{1580}$ = 1.1, Carbon components: agglomerated carbon components and fibrous carbon components, Half width (2θ) = 1.85°, Si (111) crystallite size 4.62 nm, FEC:EC:DMC (1:2:7 volume ratio) LiPF$_6$ 1.2 mol/kg, Positive electrode LiCoO$_2$

| | CyHz fragment | | | Zeta potential (mV) | Formation condition | | | Carbon coating amount (%) | Initial efficiency (%) | Retention on rate (%) |
|---|---|---|---|---|---|---|---|---|---|---|
| | y | z | D/E | | CVD gas | CVD temperature | CVD post treatment | | | |
| Comparative example 6-1 | — | — | — | −10 | — | — | — | 0 | 58.2 | 61.3 |
| Comparative example 6-2 | — | — | — | 10 | — | — | firing in NH$_3$ | 0 | 57.5 | 58.2 |
| Example 1-3 | 2, 3, 4 | 2z − 3, 2z − 1, 2z + 1 | 0.8 | −50 | methane | 1000° C. | firing at 1000° C. | 5 | 68.0 | 80.1 |
| Example 6-1 | 2, 3, 4 | 2z − 2, 2z, 2z + 2 | 0.8 | −100 | methane | 1000° C. | firing at 1150° C. | 5 | 67.9 | 78.2 |
| Example 6-2 | 2, 3, 4, 5 | 2z − 2, 2z, 2z + 2 | 0.65 | −20 | propane | 900° C. | — | 5 | 67.7 | 79.8 |
| Example 6-3 | 2, 3, 4, 5, 6 | 2z − 2, 2z, 2z + 2 | 0.58 | −10 | butadiene | 900° C. | — | 5 | 66.8 | 78.5 |
| Example 6-4 | 2, 3, 4, 5 | 2z − 2, 2z, 2z + 2 | 0.61 | 10 | methane | 900° C. | firing in NH$_3$ | 5 | 62.5 | 76.5 |
| Example 6-5 | 2, 3, 4, 5 | 2z − 2, 2z, 2z + 2 | 1.2 | −10 | ethylene | 900° C. | — | 5 | 65.2 | 77.0 |
| Example 6-6 | 2, 3, 4, 5 | 2z − 2, 2z, 2z + 2 | 2.6 | −5 | methane | 850° C. | — | 5 | 64.1 | 76.8 |

As shown in Table 6, when fragments of $C_yH_z$ compound were detected and satisfied 2.5≥D/E≥0.3, the battery performances were improved. Meanwhile, when the carbon coating was not formed like comparative examples 6-1 and 6-2, the electronic conductivity degraded in the negative electrode, and thus the retention rate and the initial efficiency degraded. Moreover, when fragments of $C_yH_z$ compound satisfying 6≥y≥2 and 2y+2≥z≥2y−2 were detected, the battery performances were improved.

In addition, the negative electrode active material particles having a negative zeta potential hardly cohered into a lump in the negative electrode mixture slurry for producing the negative electrode and thus improved the battery performances. Moreover, the negative electrode active material particles having a negative zeta potential ζ[mV] of −800<ζ[mV]<0 could prevent excessive repulsive force against the other particles and prevent uneven distribution in the negative electrode, thus improving the battery performances. Example 6-4, in which the zeta potential was positive, demonstrated that the retention rate was sufficiently increased, but the initial efficiency was reduced, compared with the examples in which the zeta potential was negative.

Examples 7-1 to 7-3

The shape of the carbon components contained in the negative electrode active material particles was adjusted. The shape of the components composed of only carbon was changed by adjusting the iron concentration of impurities contained in the silicon compound or adjusting the pressure during CVD.

The cycle performance and the first charge and discharge performance of the secondary batteries in examples 7-1 to 7-3 were investigated. The result is given in Table 7.

TABLE 7

SiOx (x = 0.9), $D_{50}$ = 5.1 μm, NMR: A/B = 0.6, (A + B)/C = 0.32, Carbon coating: Density 1.6 g/cm$^3$, Amount 5%, Average thickness 110 nm, Coverage 90%, Charge and discharge capacity 280 mAh/g, Absorption-desorption isotherm: Type II, BET specific surface area = 5.1 m$^2$/g, Compression resistivity (at 1.5 g/cm$^3$) = 0.12 Ω · cm, Raman $I_{1330}/I_{1580}$ = 1.1, TOP-SIMS $C_yH_z$ y = 2,3,4 z = 2y − 3, 2y − 1, 2y + 1, D/E = 0.8, Zeta potential = −50 mV, Half width (2θ) = 1.85°, Si (111) crystallite size 4.62 nm, FEC:EC:DMC (1:2:7 volume ratio) LiPF$_6$ 1.2 mol/kg, Positive electrode LiCoO$_2$

| | Carbon components | Initial efficiency (%) | Retention rate (%) |
|---|---|---|---|
| Example 7-1 | Agglomerated carbon components are contained | 67.2 | 79.2 |
| Example 7-2 | Fibrous carbon components are contained | 67.9 | 79.9 |
| Example 1-3 | Agglomerated carbon components and fibrous carbon components are contained | 68.0 | 80.1 |
| Example 7-3 | Neither agglomerated carbon components nor fibrous carbon components are contained | 66.8 | 78.8 |

As shown in Table 7, the particles containing either or both of agglomerated carbon components and fibrous components improved the initial efficiency and the retention rate, compared with the particles not containing such carbon components.

Examples 8-1 to 8-5

A secondary battery was produced as in example 1-3 except that the median size of the silicon compound was adjusted. The median size was adjusted by changing pulverization time and classification conditions when the silicon compound was produced. The cycle performance and first charge and discharge performance of the secondary batteries in examples 8-1 to 8-5 were investigated. The result is given in Table 8.

TABLE 8

SiO$x$ (x = 0.9), D$_{50}$ = 5.1 μm, NMR: A/B = 0.6,
(A + B)/C = 0.32, Carbon coating: Density 1.6 g/cm$^3$,
Amount 5%, Average thickness 110 nm, Coverage 90%, Charge
and discharge capacity 280 mAh/g, Absorption-desorption
isotherm: Type II, BET specific surface area = 5.1 m$^2$/g,
Compression resistivity (at 1.5 g/cm$^3$) = 0.12 Ω · cm,
Raman I$_{1330}$/I$_{1560}$ = 1.1, Carbon components: agglomerated
carbon components and fibrous carbon components,
TOF-SIMS C$_y$H$_z$, y = 2,3,4 z = 2y − 3, 2y − 1, 2y + 1, D/E = 0.8,
Zeta potential = −50 mV, Half width (2θ) = 1.85°, Si (111)
crystallite size 4.62 nm, FEC:EC:DMC (1:2:7 volume ratio)
LiPF$_6$ 1.2 mol/kg, Positive electrode LiCoO$_2$

| | Median size (μm) | Initial efficiency (%) | Retention rate (%) |
|---|---|---|---|
| Example 8-1 | 0.3 | 67.2 | 77.1 |
| Example 8-2 | 1.3 | 67.6 | 79.8 |
| Example 1-3 | 5.1 | 68.0 | 80.0 |
| Example 8-3 | 8.1 | 67.8 | 79.9 |
| Example 8-4 | 12.3 | 67.4 | 79.1 |
| Example 8-5 | 31.1 | 66.9 | 77.6 |

As shown in Table 8, the retention rate and the initial efficiency changed in response to the variation in median size of the silicon compound. Examples 8-2 to 8-4 demonstrated that the retention rate was improved when the median size of the silicon compound ranged from 0.5 μm to 20 μm. In particular, a better retention rate was obtained when the median size ranged from 0.5 μm to 12 μm.

Examples 9-1 and 9-2

A secondary battery was produced as in example 1-3 except that the silicon compound was doped with lithium so that the negative electrode active material contained lithium. Li-doping was performed by the thermal doping method in example 9-1, and by the electrochemical method in example 9-2.

The cycle performance and first charge and discharge performance of the secondary batteries in examples 9-1 and 9-2 were investigated. The result is given in Table 9.

TABLE 9

SiO$x$ (x = 0.9), D$_{50}$ = 5.1 μm, NMR: A/B = 0.6,
(A + B)/C = 0.32, Carbon coating: Density 1.6 g/cm$^3$,
Amount 5%, Average thickness 110 nm, Coverage 90%, Charge
and discharge capacity 280 mAh/g, Absorption-desorption
isotherm: Type II, BET specific surface area = 5.1 m$^2$/g,
Compression resistivity (at 1.5 g/cm$^3$) = 0.12 Ω · cm,
Raman I$_{1330}$/I$_{1500}$ = 1.1, Carbon components: agglomerated
carbon components and fibrous carbon components,
TOF-SIMS C$_y$H$_z$, y = 2,3,4 z = 2y − 3, 2y − 1, 2y + 1, D/E = 0.8,
Zeta potential = −50 mV, Half width (2θ) = 1.85°, Si (111)
crystallite size 4.62 nm, FEC:EC:DMC (1:2:7 volume ratio)
LiPF$_6$ 1.2 mol/kg, Positive electrode LiCoO$_2$

| | Li-doping | Retention rate (%) | Initial efficiency (%) |
|---|---|---|---|
| Example 1-3 | — | 68.0 | 80.0 |
| Example 9-1 | Thermal doping method | 74.1 | 78.8 |
| Example 9-2 | Electrochemical modification method | 76.2 | 81.1 |

As shown in Table 9, when the negative electrode active material contained lithium, the initial efficiency was improved. Along with this improvement, discharging cutoff voltage of the negative electrode in the secondary battery was reduced, and the retention rate was improved.

Examples 10-1 to 10-6

In examples 10-1 to 10-6, a secondary battery was produced in the almost same manner as in example 1-3 except that a carbon-based active material (a mixture of synthetic graphite and natural graphite with mass ratio of 1:1) was added as the negative electrode material, the ratio of the silicon compound to the carbon-based active material in the negative electrode (or the proportion of the silicon compound (SiO material) in the whole active material) was changed, and the binder was accordingly changed. In examples 10-1 to 10-3, a mixture of styrene-butadiene rubber (represented by SBR in Table 10) and CMC was used as the binder. In examples 10-4 to 10-6, polyimide (represented by PI in Table 10) was used as the binder.

Comparative Example 10-1

A secondary battery was produced as in example 1-3 except that inventive negative electrode active material was not contained, but the same carbon-based active material as in examples 10-1 and 10-6 was used alone as the negative electrode active material, and a lithium nickel cobalt aluminum complex oxide was used as the positive electrode material.

The cycle performance and the first charge and discharge performance of the secondary batteries in examples 10-1 to 10-6 and comparative example 10-1 were investigated. In addition, the battery capacity density (mAh/cm$^3$) in examples 10-1 to 10-6 and comparative example 10-1 was measured, and relative battery capacity density was each calculated on the basis of the battery capacity density in comparative example 10-1. The result is given in Table 10.

TABLE 10

SiO$x$ (x = 0.9), D$_{50}$ = 5.1 μm, NMR: A/B = 0.6,
(A + B)/C = 0.32, Carbon coating: Density 1.6 g/cm$^3$,
Amount 5%, Average thickness 110 nm, Coverage 90%, Charge
and discharge capacity 280 mAh/g, Absorption-desorption
isotherm: Type II, BET specific surface area = 5.1 m$^2$/g,
Compression resistivity (at 1.5 g/cm$^3$) = 0.12 Ω · cm,
Raman I$_{1330}$/I$_{1580}$ = 1.1, Carbon components: agglomerated
carbon components and fibrous carbon components,
TOF-SIMS C$_y$H$_z$ y = 2,3,4 z = 2y − 3, 2y − 1, 2y + 1, D/E = 0.8,
Zeta potential = −50 mV, Half width (2θ) = 1.85°, Si (111)
crystallite size 4.62 nm, Carbon-based active material:
synthetic graphite/natural graphite (1:1 mass ratio), D$_{50}$ = 20 μm,
FEC:EC:DMC (1:2:7 volume ratio) LiPF$_6$ 1.2 mol/kg

| | Proportion of silicon compound (mass %) | Relative volume battery capacity density | Binder | Retention rate (%) | Initial efficiency (%) |
|---|---|---|---|---|---|
| Comparative example 10-1 | 0 | 1 | SBR/CMC | 94.1 | 89.8 |
| Example 10-1 | 4 | 1.03 | SBR/CMC | 90.3 | 85.7 |
| Example 10-2 | 5 | 1.04 | SBR/CMC | 90.0 | 84.9 |
| Example 10-3 | 10 | 1.08 | SBR/CMC | 87.0 | 81.5 |
| Example 10-4 | 25 | 1.13 | PI | 86.2 | 75.7 |
| Example 10-5 | 50 | 1.17 | PI | 85.3 | 71.4 |
| Example 10-6 | 100 | 1.18 | PI | 84.9 | 68.0 |

As shown in Table 10, when the proportion of the silicon compound was increased, the capacity of the negative electrode increased, but the initial efficiency and the retention rate decreased. In Table 10, the relative battery capacity density was based on the battery capacity density in comparative example 10-1, in which the proportion of the silicon compound was 0, NCA (lithium nickel cobalt aluminum complex oxide) was used as the positive electrode material, and the discharging cutoff voltage in the battery was 2.5 V, as mentioned above. When the proportion of silicon compound was decreased, the initial efficiency and the retention rate were improved, but the capacity density decreased. In particular, comparative example 10-1, in which the carbon-based active material alone was used as the negative electrode material, failed to obtain a lithium-ion secondary battery having a high battery capacity density. The battery capacity density was sufficiently improved especially when the proportion of the silicon compound was 5 mass % or more.

Examples 11-1 to 11-8

A secondary battery was produced as in example 10-2 except that the ratio F/G was adjusted by changing the median size F of the carbon-based active material and the median size G of the silicon-based active material in the negative electrode active material layer.

The cycle performance and first charge and discharge performance of the secondary batteries in examples 11-1 to 11-8 were investigated. The result is given in Table 11.

As shown in Table 11, the size of the carbon-based active material in the negative electrode active material layer was preferably equal to or larger than that of the silicon compound. That is, $F/G \geq 0.5$ is preferable. When the silicon compound, which was expandable and contractible, was equal to or smaller than the carbon-based negative electrode material, the breakage of the mixture layer could be prevented. When the carbon-based negative electrode material was large relative to the silicon compound, the volume density of the negative electrode at charging, the initial efficiency, and thus the battery energy density were improved. In particular, the layer satisfying $25 \geq F/G \geq 0.5$ improved the initial efficiency and the retention rate.

Examples 12-1 to 12-4

A secondary battery was produced as in example 10-2 except that the kind of the carbon-based active material in the negative electrode was changed.

The cycle performance and first charge and discharge performance of the secondary batteries in examples 12-1 to 12-4 were investigated. The result is given in Table 12.

TABLE 11

SiOx (x = 0.9), NMR: A/B = 0.6, (A + B)/C = 0.32,
Carbon coating: Density 1.6 g/cm$^3$, Amount 5%, Average
thickness 110 nm, Coverage 90%, Charge and discharge capacity
280 mAh/g, Absorption-desorption isotherm: Type II, BET
specific surface area = 5.1 m$^2$/g, Compression resistivity (at 1.5 g/cm$^3$) =
0.12 Ω · cm, Raman $I_{1330}/I_{1580}$ = 1.1, Carbon components:
agglomerated carbon components and fibrous carbon components,
TOF-SIMS $C_yH_z$ y = 2,3,4 z = 2y − 3, 2y − 1, 2y + 1, D/E = 0.8, Zeta
potential = −50 mV, Half width (2θ) = 1.85°, Si (111) crystallite
size 4.62 nm, Carbon-based active material: synthetic graphite/natural
graphite (1:1 mass ratio), FEC:EC:DMC (1:2:7 volume ratio)
LiPF$_6$ 1.2 mol/kg

| | Median size G of silicon-based active material (μm) | Median size F of carbon-based active material (μm) | F/G | Initial efficiency (%) | Retention rate (%) |
|---|---|---|---|---|---|
| Example 11-1 | 0.5 | 40 | 80 | 80.4 | 83.6 |
| Example 10-2 | 4 | 20 | 5 | 84.9 | 90.0 |
| Example 11-2 | 4 | 16 | 4 | 84.8 | 90.0 |
| Example 11-3 | 4 | 12 | 3 | 84.5 | 88.8 |
| Example 11-4 | 4 | 8 | 2 | 84.1 | 88.5 |
| Example 11-5 | 4 | 4 | 1 | 83.5 | 87.8 |
| Example 11-6 | 4 | 2 | 0.5 | 83.2 | 87.8 |
| Example 11-7 | 12 | 4 | 0.33 | 80.5 | 84.4 |
| Example 11-8 | 8 | 16 | 2 | 82.2 | 87.8 |

TABLE 12

SiOx (x = 0.9), $D_{50}$ = 5.1 μm, NMR: A/B = 0.6,
(A + B)/C = 0.32, Carbon coating: Density 1.6 g/cm$^3$,
Amount 5%, Average thickness 110 nm, Coverage 90%, Charge
and discharge capacity 280 mAh/g, Absorption-desorption
isotherm: Type II, BET specific surface area = 5.1 m$^2$/g,
Compression resistivity (at 1.5 g/cm$^3$) = 0.12 Ω · cm,
Raman $I_{1330}/I_{1580}$ = 1.1, Carbon components: agglomerated
carbon components and fibrous carbon components, TOF-SIMS
$C_yH_z$ y = 2,3,4 z = 2y − 3, 2y − 1, 2y + 1, D/E = 0.8, Zeta
potential = −50 mV, Half width (2θ) = 1.85°, Si (111) crystallite
size 4.62 nm, Carbon-based active material: $D_{50}$ = 20 μm,
FEC:EC:DMC (1:2:7 volume ratio) LiPF$_6$ 1.2 mol/kg

| | Carbon-based active material species | Initial efficiency (%) | Retention rate (%) |
|---|---|---|---|
| Example 12-1 | synthetic graphite | 86.0 | 88.1 |
| Example 12-2 | natural graphite | 83.8 | 90.3 |
| Example 10-2 | synthetic graphite and natural graphite (1:1 mass ratio) | 84.9 | 90.0 |
| Example 12-3 | hard carbon and natural graphite (1:1 mass ratio) | 81.3 | 87.1 |
| Example 12-4 | synthetic graphite and soft carbon (1:1 mass ratio) | 80.4 | 86.5 |

As shown in Table 12, a graphite material such as synthetic graphite and natural graphite is preferably contained as the carbon-based active material in the negative electrode active material layer. The reason is that the battery performances were relatively improved when the negative electrode was produced by mixing a graphite material with the silicon compound since the graphite material enabled high initial efficiency and retention rate.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method of producing a negative electrode material for a non-aqueous electrolyte secondary battery containing negative electrode active material particles, the method comprising:
   producing a silicon compound expressed by SiO$_x$ where 0.5≤x≤1.6;
   coating a surface of the silicon compound with a carbon coating composed of a substance at least partially containing carbon;
   estimating a density of the carbon coating on the silicon compound;
   performing adsorption-desorption isotherm measurement with nitrogen gas on the silicon compound with the carbon coating;
   selecting, from the silicon compound with the carbon coating, a silicon compound having the carbon coating with a density ranging from 1.2 g/cm$^3$ to 1.9 g/cm$^3$ and having a characteristic of type II or type III adsorption-desorption isotherm in the IUPAC classification as obtained by the adsorption-desorption isotherm measurement with nitrogen gas; and
   using the selected silicon compound coated with the carbon coating as the negative electrode active material particles to produce the negative electrode material.

\* \* \* \* \*